United States Patent
Haas et al.

(10) Patent No.: US 7,477,425 B2
(45) Date of Patent: Jan. 13, 2009

(54) BIASABLE DRIVE FOR AN IMAGE SCANNER CARRIAGE

(75) Inventors: William Robert Haas, Fort Collins, CO (US); Kirk Steven Tecu, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1235 days.

(21) Appl. No.: 10/199,833

(22) Filed: Jul. 19, 2002

(65) Prior Publication Data

US 2004/0012824 A1   Jan. 22, 2004

(51) Int. Cl.
*H04N 1/04* (2006.01)

(52) U.S. Cl. .................. 358/474; 358/497; 358/486; 399/211; 399/386

(58) Field of Classification Search ............ 358/474, 358/498, 497, 496, 505, 487, 486; 399/386, 399/211, 214; 355/135
See application file for complete search history.

(56) References Cited

U.S. PATENT DOCUMENTS

| | | | | |
|---|---|---|---|---|
| 3,832,057 A | * | 8/1974 | Shogren | 399/212 |
| 3,918,806 A | * | 11/1975 | Cook | 399/210 |
| 3,995,954 A | * | 12/1976 | Dir et al. | 355/71 |
| 4,018,523 A | * | 4/1977 | Hughes | 399/200 |
| 4,120,578 A | * | 10/1978 | Daniels et al. | 399/200 |
| 4,171,901 A | | 10/1979 | Takizawa et al. | |
| 4,218,127 A | | 8/1980 | Costanza et al. | |
| 4,332,460 A | | 6/1982 | Costanza | |
| 4,332,461 A | * | 6/1982 | Cail et al. | 399/200 |
| 4,460,268 A | | 7/1984 | Forrester | |
| 4,771,315 A | | 9/1988 | Satomi | |
| 4,965,638 A | | 10/1990 | Hediger | |
| 5,245,463 A | | 9/1993 | Goto | |
| 5,301,244 A | * | 4/1994 | Parulski | 382/319 |
| 5,392,100 A | * | 2/1995 | Yoshida | 399/211 |
| 5,412,198 A | | 5/1995 | Dvorkis | |
| 5,442,449 A | * | 8/1995 | Stemmle et al. | 358/296 |

(Continued)

FOREIGN PATENT DOCUMENTS

EP        0038070        10/1981

(Continued)

OTHER PUBLICATIONS

Foreign Search Report dated Nov. 26, 2003—3 pages.

(Continued)

*Primary Examiner*—Negussie Worku

(57) ABSTRACT

A method for scanning an image of media comprises biasing a scanner carriage for movement relative to a platen and releasing the carriage to move relative to the platen, the carriage scanning an image with a scanner head disposed therein. An image scanner comprises a housing, a platen disposed on the housing, a carriage disposed in the housing, the carriage comprising a scanner head adapted for scanning an image, a biasable drive moving the carriage relative to the platen for high-speed scans, and a drive mechanism loading the biasable drive for the high-speed scans and moving the carriage relative to the platen for low-speed scans. An encoder for sensing position of a scanner carriage comprises a grating disposed in a scanner housing, and an optical sensor for sensing the grating during biased movement of a scanner carriage, the sensor providing carriage position information for rastering an image of scanned media.

53 Claims, 2 Drawing Sheets

U.S. PATENT DOCUMENTS

| | | | |
|---|---|---|---|
| 5,594,232 A | | 1/1997 | Giordano |
| 5,621,371 A | | 4/1997 | Dvorkis |
| 5,695,187 A | * | 12/1997 | Tazawa et al. ............... 271/266 |
| 5,797,066 A | * | 8/1998 | Kishigami et al. ............ 399/51 |
| 5,875,042 A | * | 2/1999 | Kashitani et al. ............ 358/474 |
| 5,946,110 A | * | 8/1999 | Hu et al. ...................... 358/474 |
| 6,026,261 A | | 2/2000 | Peng |
| 6,057,944 A | * | 5/2000 | Takeuchi .................... 358/468 |
| 6,104,475 A | * | 8/2000 | Cook et al. ................... 355/84 |
| 6,108,505 A | | 8/2000 | Hayashi |
| 6,204,914 B1 | * | 3/2001 | Inagaki et al. ............... 355/402 |
| 6,295,144 B1 | * | 9/2001 | Kang ......................... 358/498 |
| 6,307,649 B1 | * | 10/2001 | Williamson ................. 358/474 |
| 6,344,906 B1 | * | 2/2002 | Gatto et al. .................. 358/443 |
| 6,388,774 B1 | * | 5/2002 | Kurata et al. ................ 358/474 |
| 7,068,401 B2 | * | 6/2006 | Johnson et al. ............. 358/474 |
| 7,154,639 B2 | * | 12/2006 | Chien ......................... 358/474 |
| 2003/0231357 A1 | * | 12/2003 | Johnson et al. ............. 358/484 |

FOREIGN PATENT DOCUMENTS

| | | |
|---|---|---|
| EP | 0 751 666 | 1/1997 |
| EP | 9 428 371 | 5/1998 |
| GB | 1451206 | 9/1976 |
| JP | 56-107263 | 8/1981 |
| JP | 60-236358 | 11/1985 |
| JP | 4144475 | 5/1992 |
| JP | 07-245682 | 9/1995 |
| JP | 11154019 | 6/1999 |

OTHER PUBLICATIONS

Search Report dated Jul. 30, 2004—2 pages.

* cited by examiner

BIASABLE DRIVE FOR AN IMAGE SCANNER CARRIAGE

FIELD OF THE INVENTION

The present invention is related to digital imaging technology, and more specifically to biasable drives for image scanner carriages.

BACKGROUND OF THE INVENTION

Typical construction of digital image scanners, particularly those described as "flatbed scanners", employs a generally rectangular-shaped scanner housing supporting a platen glass against which one may lay a piece of media, such as a piece of paper for scanning. An optical scanner head moves opposite the media and scanner associated software and/or firmware typically transforms an optical image of the media into a data file. Other scanners, often called "scroll feed scanners" function similar to a facsimile machine in that they feed sheets of paper through a stationary scanning mechanism one at a time.

Construction of flatbed scanners typically employs an optical carriage, housing an optical scanning head or the like; a carriage rod that aligns and guides the optical carriage down a scan-path below the platen; and a motorized drive mechanism employing a direct-current (DC) motor and/or stepper motor. The optical carriage has optics, also known as a scanner head, that normally employ mirrors. These optics map light at a location coinciding with the upper surface of the platen glass, where media is typically resting, to a charge couple device (CCD) or the like. The CCD converts optical photons into electrons, used to create a data signal. The data provided by the CCD is processed into a final form such as an image file, for example a bitmap (BMP) file, tag image file format (TIFF) file, Joint Photographics Expert Group (JPEG) file or the like.

In operation, the optics or scanner head of the carriage usually scans a very thin strip, commonly referred to as a scan line. Then typically the motorized drive mechanism translates the optical carriage one small step, and then the scanner head takes another scan line, followed by another step, and another scan. This step-and-scan process is repeated to create a rastered scan of a whole image of the media disposed against the platen.

Generally, drive technologies for scanner optical carriages attempt to translate a carriage in some controlled manner to create the scan lines for rastering together to create a digital image file. Multi-speed scanners use dynamic ranges of a drive motor to provide a multiple-speed carriage drive. Depending on the resolution required, some scanners may employ five or more speeds. Other motors may provide an infinite number of speeds, between an upper and a lower limit. In some scanners a pulse frequency to a stepper motor is modified to generate these different speeds. Another existing scanner carriage drive mechanism is a DC motor that employs a servo methodology.

A stepper motor has a rotor that moves through a fixed angle in response to a pulse from a controlling element. The stepper motor makes discrete steps that are translated to the carriage via a transmission and/or a belt and pulley system. The steps are based on characteristics of the stepper motor and/or a drive-train disposed between the stepper motor and scanner carriage. A stepper motor employs an open loop control system. A stepper motor driving a scanner carriage is sent a pulse and the system assumes the carriage moves one step in response. Therefore, existing stepper motor-based scanner carriage drives do not typically need intermediate position sensing.

A servo-drive mechanism typically employs a drive belt-and-pulley system to basically pull the carriage back and forth. Since this technology does not employ discrete steps, electronic logic to determine location, often based on velocity and/or acceleration of the carriage, is employed to provide a closed-loop control system. To this end, many DC servo scanner carriage drives include some type of optically-encoded position sensing, or the like. The DC servo, closed-loop system typically employs control algorithms. Otherwise, construction of these two types of existing scanner carriage drive systems are similar, employing a transmission and/or belt assembly.

Other types of scanner drive mechanisms may include screw drives, gear-wheel and rack drives, or the like. Screw drives may replace or augment the aforementioned carriage rod. A rack may be molded into, or attached to, the bottom of an existing scanner housing for a gear-wheel and rack-drive mechanism. Regardless, drive technologies for scanner carriages are intended to translate a scanner carriage in a controlled manner to facilitate creation of scan lines to be rastered together to develop a digital image.

Increasing resolution capability demanded by the scanner market translates into smaller and smaller steps between scan lines to provide higher resolutions, that in turn, results in slower scan speeds. However, extremely fast scans at low-resolution, such as used for a preview scan, are in demand as well. Existing scanner carriage drive motors specifically designed for high-resolution, high-accuracy scans typically do not have very fast performance at lower resolutions. DC servo or stepper motors only have a limited dynamic range, limiting the upper speed threshold that a scanner carriage may be moved so as to provide the required precise high-resolution, slow-speed scans. For example, stepper motors can only pulse within a limited range of frequencies. Problematically, use of a dual-speed transmission or two different motors with different drive speeds is not desirable as it raises cost and complexity issues.

Uses for springs in the scanner or copier industry abound. For example, springs of various types are used to provide vibration or oscillation for universal product code (UPC) scanners or the like as disclosed in Goto, U.S. Pat. No. 5,245,463; Giordano, U.S. Pat. No. 5,594,232; and Dvorkis, U.S. Pat. Nos. 5,621,371 and 5,412,198. A spring may be employed in conjunction with a motor-driven cable to tension a carriage drive cable and/or to stabilize a scan head by dampening vibration in such a cable. U.S. Patents related to such use of a spring in a scanner or copier include: Yoshida, U.S. Pat. No. 5,392,100; Takizawa, U.S. Pat. No. 4,171,901; Hediger, U.S. Pat. No. 4,965,638; Satomi, U.S. Pat. No. 4,771,315; Hayashi, U.S. Pat. No. 6,108,505; Peng, U.S. Pat. No. 6,026,261; and Costanza, U.S. Pat. No. 4,218,127. Forrester, U.S. Pat. No. 4,460,268, and Cook, U.S. Pat. No. 3,918,806 are examples of copier mechanisms driven by dash pots that use a spring to rapidly return the copier head to a start position, without copying during the return.

BRIEF SUMMARY OF THE INVENTION

An embodiment of a method for scanning an image of media using a scanner comprises biasing a scanner carriage for movement relative to a platen and releasing the carriage to move relative to the platen, the carriage scanning an image with a scanner head disposed therein.

An embodiment of an image scanner comprises a housing, a platen disposed on the housing, a carriage disposed in the housing, the carriage comprising a scanner head adapted for scanning an image, a biasable drive moving the carriage relative to the platen for high-speed scans, and a drive mechanism loading the biasable drive for the high-speed scans and moving the carriage relative to the platen for low-speed scans.

An encoder for sensing position of an image scanner carriage comprises a grating disposed in a scanner housing, and an optical sensor for sensing the grating during biased movement of a scanner carriage, the sensor providing carriage position information for rastering an image of scanned media.

DETAILED DESCRIPTION

The present invention is directed to systems and methods that provide a mechanism to facilitate fast-preview speeds for a scanner, while enabling the scanner to use a drive mechanism that may make accurate, high-resolution scans. The present invention provides a solution to the aforementioned disparate preview and high-resolution scanner carriage translation speed dichotomy that is cost-effective and mechanically sound, requiring little, if any, additional space.

Preferably a flatbed scanner employing the present invention has a motorized drive mechanism that may employ a stepper motor, a DC servo-motor, or the like, for high-resolution scans, with a biasable drive, such as a spring-loaded drive or spring drive mechanism, to drive the carriage for high-speed scans, as detailed below. Preferably, both of these drives are connected to a single scanner carriage. The biasable drive is preferably used to drive the carriage or other optical mechanism of the scanner at a relatively high-rate of speed during low-resolution scans, such as preview scans. These low-resolution scans may also be used to produce image files where lower resolution is acceptable.

In operation, the biasable drive is preferably loaded, such as by stretching a spring, using the stepper motor or servo-motor that drives the carriage during higher resolution scans. Advantageously, use of such a biasable drive enables a scanner with very high-resolution capability, and a main drive that is geared for such high-resolution use, to have very fast performance for at least one lower resolution. A further advantage of using a biasable drive, in contrast to other possible alternate solutions to the above-described dichotomy for scanner carriage speeds, is that such a biasable drive is very low cost and employs a reliable mechanism that is highly tunable, such as a spring.

Figure 1:
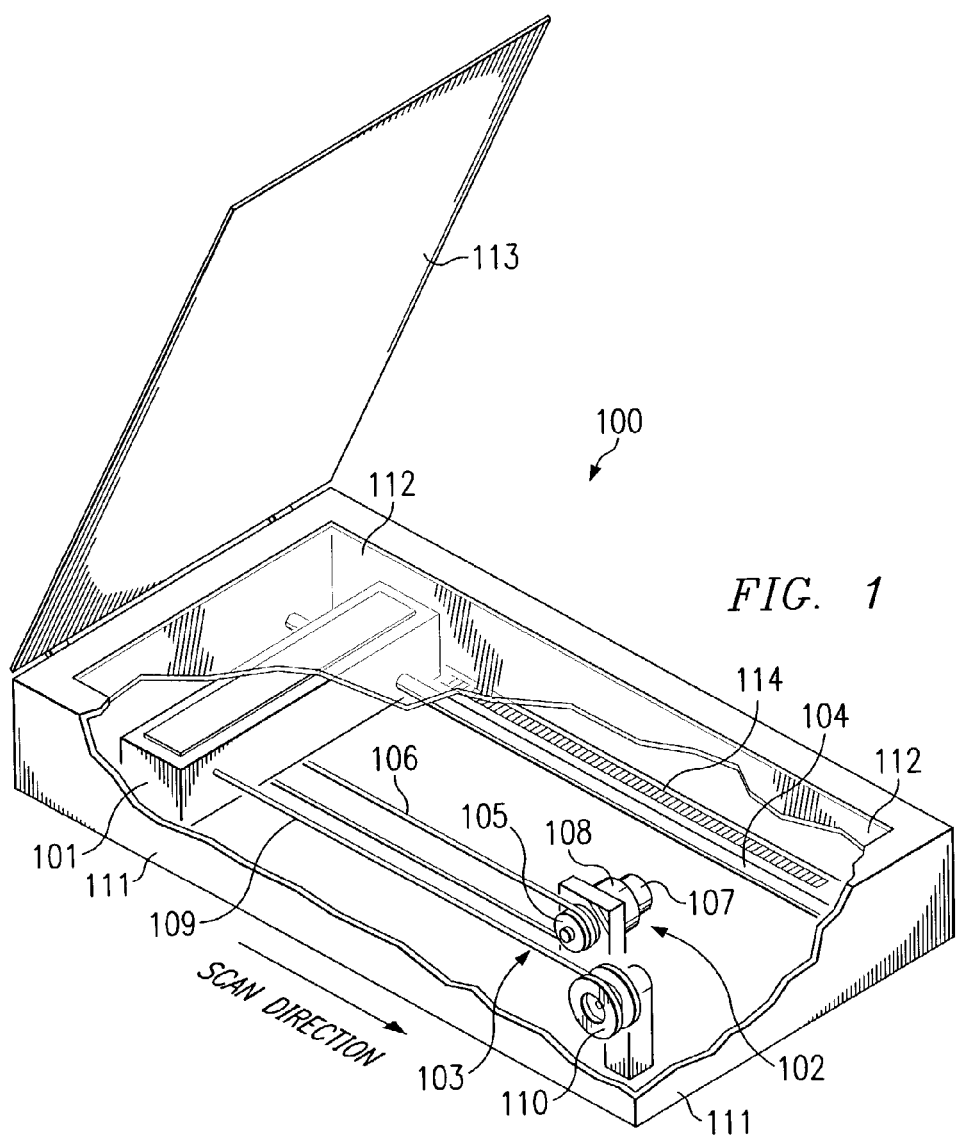
FIG. 1 is a partially-fragmented perspective view of an embodiment of a flatbed optical image scanner with a bias-driven scanner carriage, in accordance with the present invention.

FIG. 1 is a partially-fragmented perspective view of an embodiment of a flatbed scanner 100 showing optical carriage 101 and two drive mechanisms 102 and 103. Optical carriage 101 preferably contains an optical head that may include optical mirrors and CCD components typical in flatbed scanners. Carriage rod 104 is one manner of providing alignment and direction of travel to a carriage during a scan, whether it be a high-resolution or a low-resolution scan. Flatbed scanner 100 may have housing 111 wherein carriage 101, drive mechanisms 102 and 103, and carriage rod 104 are disposed. Platen 112 is preferably supported by housing 111. Cover 113 may be hinged, preferably removably-hinged, to housing 111 to close over platen 112 and media disposed thereupon to shut out ambient light and/or to hold media in place on platen 112 during scanning operations.

Motorized drive mechanism 102 is shown in the form of a pulley 105 and belt 106 mechanism attached to either a DC servo or stepper motor 107, via transmission system 108. Other primary drive mechanisms known to those skilled in the art may be employed by a scanner employing the present invention.

In accordance with the present invention, biasable or spring drive 103 may be employed for high-speed, low-resolution scans, such as a fast-preview scan. As illustrated in FIG. 1, spring drive 103 may employ cable 109 and spiral spring spool 110. However, biasable drive 103 may take other forms such as a coil, tension, helical or compression spring. Cable and spiral spring spool system 103, or any other spring employed in accordance with the present invention, preferably provides relatively constant tension throughout traversal of optical carriage 101, after overcoming initial inertia. Additionally, a variety of spring-deployment configurations may be used. For example, the spring may be attached or integrated into the carriage. As a further example, such a carriage-mounted spring may employ a spring-driven gear to drive the carriage along a rack gear disposed on the floor of the housing. Yet other alternative embodiments use more than one spring in any of the above-described configurations or combinations of these configurations.

In FIG. 1, the optical carriage is shown in what might be considered a "home" position, ready to start a scan. If the scan is to be performed in a fast-preview mode or the like, motorized drive mechanism 102 would preferably be set in a neutral, or free, setting. If motorized drive mechanism 102 employs a stepper motor, the stepper motor may be set in such a neutral setting by shorting the coils of the stepper motor as detailed below in the description of FIG. 4. Shorting the coils on a stepper motor releases the motor and reduces the electromagnetic resistance produced by the motor when free-wheeling. Setting drive motor 107 to a neutral setting enables relatively low-resistance to exist in motorized drive mechanism 102 and tension in loaded biasable drive 103 preferably overcomes any remaining resistance and the inertia of carriage 101, pulling optical carriage 101 down carriage rod 104 at a rapid speed, facilitating a fast-preview or other low-resolution, high-speed scan.

To return optical carriage 101 to the home position and reload biasable drive 103, motorized drive mechanism 102 is preferably re-engaged and carriage 101 is preferably pulled back to the home position. In a standard, or high-resolution scanning mode, biasable drive 103 is not the main carriage-driving mechanism. Although biasable drive 103 may still exert force on carriage 101, motorized drive mechanism 102 is preferably used to perform higher-resolution, lower-velocity, high-accuracy scans in a standard scanning mode, or the like. Alternatively, biasable drive 103 may be disengaged from carriage 101 for normal-speed or low-speed scanning functionality performed employing motorized drive 102.

Advantageously, the load of a spiral spool-type spring, such as shown in FIG. 1, has a force curve that is relatively easy to manipulate, particularly the beginning loading and the unloaded state of the spring at the end position for carriage 101. Advantageously, most springs provide slightly stronger force upon initial release. In accordance with the present invention this provides additional force to initially overcome inertia of carriage 101 and any resistance presented by motorized drive mechanism 102, and provide a relatively flat level of pulling force once the carriage starts moving.

With a motorized drive mechanism that uses a stepper motor, being an open loop system, the position of the carriage 101 is determined based on a number of motor steps during a normal or low-speed scan. However, when biasable drive 103 is employed for a fast-preview scan or the like, the position of carriage 101 is preferably tracked, particularly if the force of biasable drive 103 varies and thus the speed of carriage 101 varies along the translation path. Linear encoder 114, disposed along carriage rod 104 or some other location along the length the translation path of carriage 101 may be employed. Linear encoder 114 may take the form of a clear strip of plastic disposed next to carriage rod 104. Encoder 114 preferably has grating lines printed onto it at a very high-resolution, and a photo diode or the like disposed on scanner carriage 101 picks up high/low, high/low or dark/light, dark/light regions along the strip and returns this information to control circuitry, software and/or firmware for scanner 100 to derive the position of carriage 101. Alternatively, an optical wheel encoder on spiral spring spool 110, on pulley 105, in motor 107 or in transmission 108 may be employed.

Regardless, a mechanism preferably enables control electronics, software and/or firmware for scanner 100 to track the velocity carriage 101 is traveling and/or the position of carriage 101 at any point in time. This tracking is desirable for control of exposure and for mapping the location of the scan lines made so that an image can be properly rastered.

In some embodiments of the present invention, the encoder of a servo-motor based-motorized drive mechanism may be used to establish velocity and/or location of carriage 101, thereby requiring no extra components beyond additional electronics and/or logic to track the higher velocity of carriage 101 afforded by the present invention in a high-speed, low-resolution scan mode.

Figure 4:
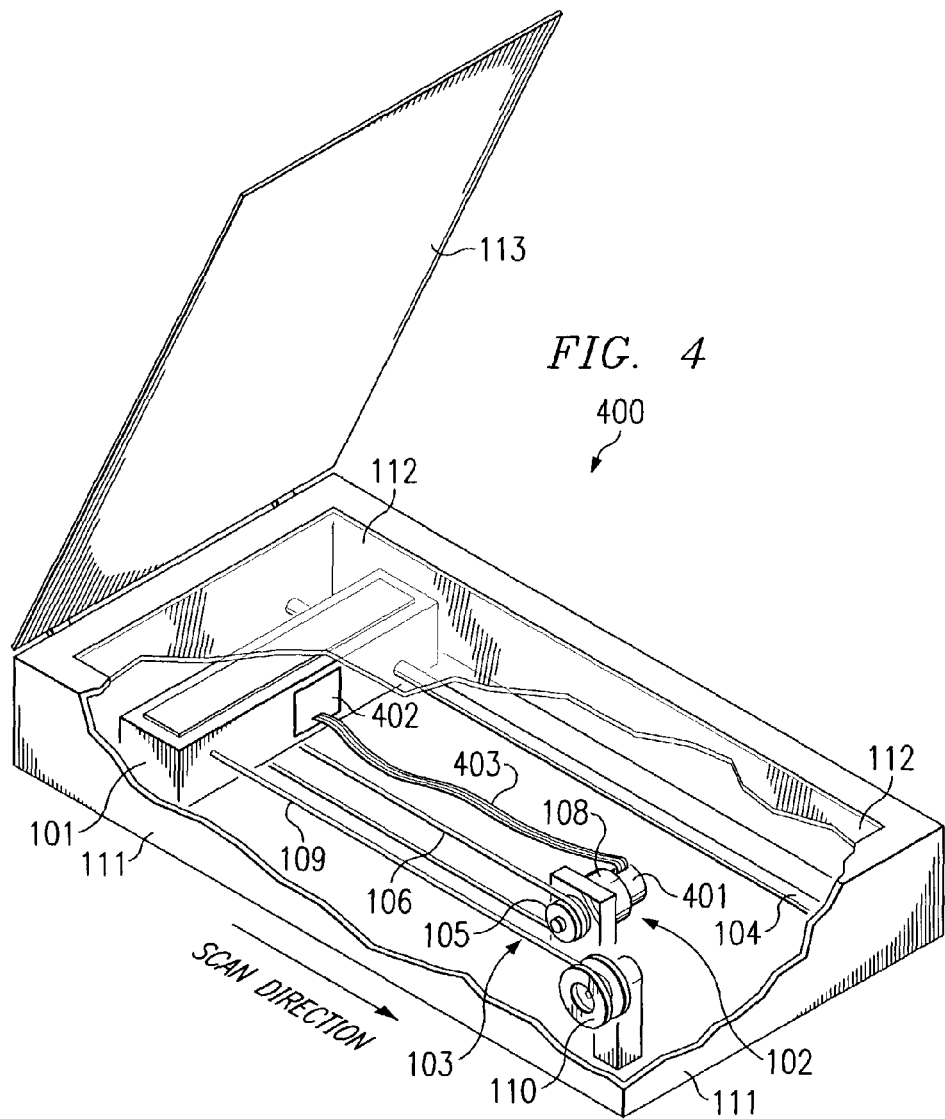
FIG. 4 is a partially-fragmented perspective view of an embodiment of a flatbed optical image scanner with a bias-driven scanner carriage employing a stepper motor as an encoder, in accordance with the present invention.

Other manners of tracking the velocity and/or location of scanner carriage 101 may be employed in accordance with the present invention. For example, as shown in FIG. 4, scanner 400 that employs a stepper motor 401 may use stepper motor 401 as an encoder. When the coils of stepper motor 401 are shorted to place motorized drive mechanism 102 in neutral, every time the rotor of stepper motor 401 is turned one step, due to the carriage being moved by the biasable drive, a small current flows from the coil(s). This current may be carried to control circuitry 402 for scanner 400 by ribbon cable 403, or other connection, linking stepper motor 401 and control circuitry 402. An electronic circuit, that may be integrated into control circuitry 402 for stepper motor 401, may be used to measure the current pulse, thus using stepper motor 401 as a location encoder.

Figure 2:
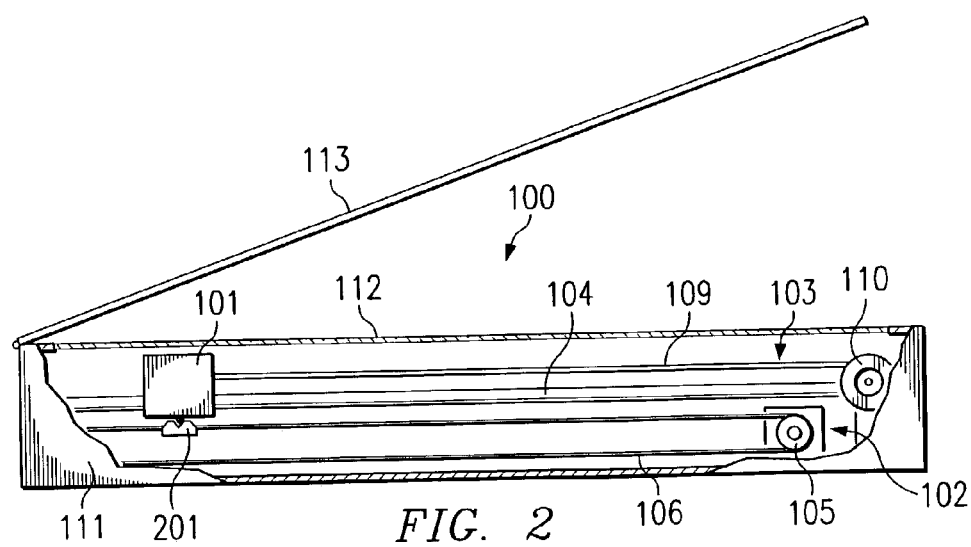
FIG. 2 is a further fragmented side view of the scanner of FIG. 1, showing an embodiment of an alternative releasable latch mechanism for the scanner carriage.

Turning to FIG. 2, an alternative latch mechanism 201 securing carriage 101 to motorized drive mechanism 102 may release to enable biasable drive 103 to pull carriage 101 in a fast-preview mode or the like. In some embodiments, the motorized drive mechanism 102 may remain connected to carriage 101 during high-speed scans using biasable drive 103, although it is preferable that motorized drive mechanism 102 present relatively low-resistance when motorized drive mechanism 102 is in a neutral setting. Thus, a relatively permanent latch between carriage 101 and motorized drive mechanism 103 may be employed when motorized drive mechanism 102 presents relatively low-resistance or friction for travel of carriage 101 when in a neutral setting. In a preferred embodiment, if motorized drive mechanism 102 creates enough resistive force to significantly impede traversal of the optical carriage in a biased drive mode, latch mechanism 201 may be disengaged from motorized drive mechanism 102, specifically from belt 106. Thus optical carriage 101 may run along carriage rod 104, alone, being pulled by biasable drive 103. After a preview scan, where carriage 101 is at an "end" position, motorized drive mechanism 102 preferably moves latch 201 into position to engage carriage 101 and latch back onto the carriage, preferably with a positive connection, so motorized drive mechanism 102 may then pull carriage 101 back to home position for a subsequent scan, whether a high-resolution, slow-speed scan or a low-resolution, high-speed scan. Advantageously, this also loads biasable drive 103 for another high-speed scan. Latch 201 may employ a servo release and/or connection to provide the aforementioned positive connection and disconnection. Similarly, a latch or release mechanism may also be employed with the aforementioned screw-drive or wheel-geared rack drives to disengage the drive from the optical carriage or other types of drives where significant frictional forces are present when the motorized drive mechanism is in neutral.

Figure 3:
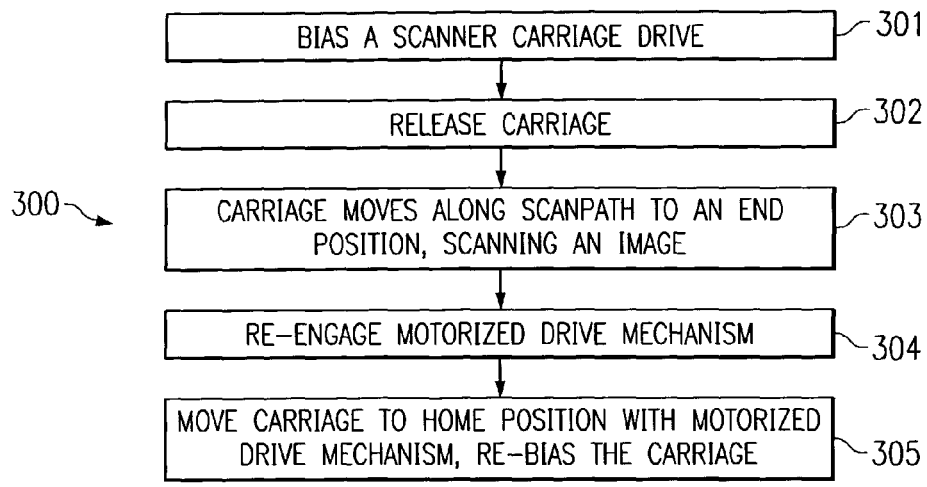
FIG. 3 is a flow chart of an embodiment of a method for providing a biasable drive to an optical image scanner carriage in accordance with the present invention.

FIG. 3 is a flowchart of embodiment 300 of a present method for providing bias drive carriage movement in an optical image scanner for rapid scanning, such as for preview scanning. At step 301 a scanner carriage is biased, preferably by loading a spring drive or the like extending from the optical head carriage to a point beyond an end point of a scanning path. Alternatively, the spring drive may drive a gear drive associated with the carriage, as described above, or otherwise bias the carriage for movement. In step 301 loading is preferably carried out by biasing a scanner carriage drive, such as by loading a spring carriage drive using a motorized carriage drive, or the like. This may be accomplished by engaging the drive mechanism and moving the carriage from an end position of the scan-path to a home position of the scan-path, thereby loading the spring drive. The drive mechanism may be engaged by moving it out of a neutral setting to a drive setting or, in another embodiment, by engaging a latch mechanism disposed between the carriage and the motorized drive mechanism. At step 302 the carriage is released by releasing a latch between the carriage and the motorized carriage drive, or the carriage is otherwise released such as by placing the motorized drive mechanism in neutral, enabling the carriage to move along the scan-path in step 303 to scan an image of media disposed on a platen glass of the scanner. As the carriage reaches the end of the scan-path, the motorized drive mechanism re-engages the carriage at step 304. In one embodiment, the motorized drive mechanism may move to the end position at step 304 to engage the latch between the carriage and motorized drive mechanism. In another embodiment, the motorized drive mechanism may be re-engaged by placing it out of a neutral setting into a drive setting. Regardless, the motorized drive mechanism preferably moves the carriage to the home position at box 305. Preferably this re-biases the carriage by reloading the biasable or spring drive in accordance with step 301. Alternatively, the motorized drive mechanism may load a biased drive mechanism during a low-speed, high-resolution scan, from the home position to the end position, thereby biasing the carriage for high-speed scanning on a return from the end potion to the home position.

What is claimed is:

1. A method for scanning an image of media using a scanner, said method comprising:
   biasing a scanner carriage for movement relative to a platen, wherein said biasing comprises loading a spring disposed between said carriage and a housing of said scanner; and
   releasing said carriage to move relative to said platen, said carriage scanning an image with a scanner head disposed therein;
   unloading the spring upon release of the carriage such that the spring applies a force to the carriage to move the carriage relative to the platen; and
   scanning an image of the media while the carriage is being moved relative to the platen by the force of the spring.

2. The method of claim 1 further comprising engaging and disengaging a motorized scanner carriage drive to selectively carry out said biasing and said releasing.

3. The method of claim 1 further comprising latching and unlatching a motorized scanner carriage drive to selectively carry out said biasing and said releasing, respectively.

4. The method of claim 3 wherein said latching and unlatching comprises servo-connecting said scanner carriage to said motorized scanner carriage drive and servo-releasing said scanner carriage from said motorized scanner carriage drive, respectively.

5. The method of claim 1 further comprising driving said carriage for high-resolution scans.

6. The method of claim 1 further comprising tracking a velocity of said scanner carriage.

7. The method of claim 1 further comprising tracking a location of said scanner carriage.

8. The method of claim 1 further comprising sensing position of said scanner carriage while said scanner carriage is moving relative to said platen.

9. The method of claim 8 wherein said sensing further comprises using a carriage drive mechanism stepper motor as a position encoder.

10. The method of claim 9 wherein said using further comprises shorting coils of said stepper motor, placing said stepper motor in a neutral setting.

11. The method of claim 1 further comprising disposing a linear encoder along a scan-path of said carriage, said encoder sensing position of said scanner carriage while said scanner carriage is moving relative to said platen.

12. The method of claim 1 further comprising disposing a wheel encoder on a motorized scanner carriage drive, said wheel encoder sensing position of said scanner carriage while said scanner carriage is moving relative to said platen.

13. The method of claim 1 further comprising disposing a wheel encoder on a spring spool biasing said carriage, said wheel encoder sensing position of said scanner carriage while said scanner carriage is moving relative to said platen.

14. An image scanner comprising:
   a housing;
   a platen disposed on said housing;
   a carriage disposed in said housing, said carriage comprising a scanner head adapted for scanning an image;
   a biasable drive moving said carriage relative to said platen for high-speed scans, wherein said biasable drive comprises a spring disposed between said carriage and said housing; and
   a drive mechanism loading said biasable drive for said high-speed scans and moving said carriage relative to said platen for low-speed scans.

15. The scanner of claim 14 wherein said spring comprises a spiral spring.

16. The scanner of claim 15 wherein said biasable drive further comprises a cable extending from said spiral spring to said carriage.

17. The scanner of claim 16 wherein said spiral spring comprises a spool receiving said cable.

18. The scanner of claim 14 wherein said spring comprises a helical spring.

19. The scanner of claim 14 wherein said drive mechanism comprises a motorized drive that translates said carriage for scanning a high-resolution image of said media and for loading said biasable drive.

20. The scanner of claim 14 further comprising an encoder for tracking a location of said carriage during scanning.

21. The scanner of claim 20 wherein said encoder comprises a linear encoder disposed along a path of said carriage.

22. The scanner of claim 20 wherein said encoder comprises a wheel encoder disposed on said drive mechanism.

23. The scanner of claim 20 wherein said encoder comprises a wheel encoder disposed on said biasable drive.

24. The scanner of claim 14 further comprising an encoder for tracking a velocity of said carriage during scanning.

25. The scanner of claim 24 wherein said encoder comprises a linear encoder disposed along a path of said carriage.

26. The scanner of claim 24 wherein said encoder comprises a wheel encoder disposed on said drive mechanism.

27. The scanner of claim 24 wherein said encoder comprises a wheel encoder disposed on said biasable drive.

28. The scanner of 14 wherein said drive mechanism comprises a stepper motor.

29. The scanner of 28 wherein said stepper motor acts as an encoder for tracking a Location of said carriage during scanning when coils of said stepper motor are shorted to place said stepper motor in a neutral setting.

30. The scanner of 28 wherein said stepper motor acts as an encoder for tracking a velocity of said carriage during scanning when coils of said stepper motor are shorted to place said stepper motor in a neutral setting.

31. The scanner of 14 further comprising a latch disposed between said drive mechanism and said carriage selectively engaging and disengaging said drive mechanism and said carriage.

32. The scanner of 31 wherein said latch is servo-operated.

33. The scanner of claim 14 wherein said high-speed scans are low-resolution scans.

34. The scanner of claim 14 wherein said high-speed scans are preview scans.

35. The scanner of claim 14 wherein said low-speed scans are high-resolution scans.

36. The scanner of claim 14, wherein the biasable drive further comprises spool receiving a cable extending to said carriage and wherein the spring is coupled to a spool.

37. The scanner of claim 14, wherein the scanner head is configured to scan the image as the spring of the biasable drive moves the scanner head relative to the platen.

38. An image scanner comprising:
   a housing;
   a platen disposed on said housing, said platen adapted to receive media to be scanned by said scanner;
   a carriage disposed in said housing, said carriage comprising a scanner head for scanning an image of said media;
   a biasable drive moving said carriage relative to said platen in a first direction for high-speed scans of said media, wherein said biasable drive comprises a spring disposed between said carriage and said housing; and
   a drive mechanism moving said carriage relative to said platen in a second direction for low-speed scans of said media, said drive mechanism loading said biasable drive when moving in said second direction for said high-speed scans in said first direction.

39. The scanner of claim 38 further comprising an encoder for tracking a position of said carriage during scanning.

40. The scanner of claim 39 wherein said encoder comprises a linear encoder disposed along a path of said carriage.

41. The scanner of claim 39 wherein said encoder comprises a wheel encoder disposed on said drive mechanism.

42. The scanner of claim 39 wherein said encoder comprises a wheel encoder disposed on said biasable drive.

43. The scanner of claim 38 wherein said drive mechanism comprises a stepper motor.

44. The scanner of claim 43 wherein and said stepper motor acts as an encoder for tracking position of said carriage during scanning when coils of said stepper motor are shorted to place said stepper motor in a neutral setting.

45. The scanner of claim 38, wherein the scanner head is configured to scan the image as the spring of the biasable drive moves the scanner head relative to the platen.

46. An image scanner comprising:
    means for scanning an image of a medium;
    means for biasing said scanning means to move relative to said medium to scan said image of said medium, the means for biasing including a spring which while being unloaded applies a force to the means for scanning to move the means for scanning relative to said medium during scanning;
    means for loading said biasing means; and
    means for selectively engaging and disengaging said loading means.

47. The scanner of claim 46 wherein said biasing means moves said scanning means at a high-speed for a low-resolution scan.

48. The scanner of claim 46 wherein said loading means comprises means for driving said carriage for high-resolution scans of said medium.

49. The scanner of claim 46 further comprising means for sensing a position of said scanning means while said scanning means is moving relative to said medium.

50. The scanner of claim 46 further comprising means for tracking a velocity of said scanning means while said scanning means is moving relative to said medium.

51. The scanner of claim 46 wherein said engaging and disengaging means comprises means for servo-connecting said scanning means to said loading means and servo-releasing said scanning means from said loading means, respectively.

52. An encoder for sensing position of an image scanner carriage, said encoder comprising::
    a stepper motor coupled with a scanner carriage, said stepper motor used to drive said scanner carriage during low-speed scans of media, coils of said stepper motor operable to be shorted disengaging said stepper motor for movement of said carriage by a biased drive to perform a scan;
    a rotor of said stepper motor, said rotor operable to rotate when said coils are shorted and said carriage is moved by said biased drive to perform said scan, said rotating providing current pulses; and
    sensors detecting said current pulses for use in determining a position of said carriage during said scan for rastering an image of said media.

53. The encoder of claim 52 wherein said movement of said carriage by a biased drive is a high-speed scan.

* * * * *

UNITED STATES PATENT AND TRADEMARK OFFICE
CERTIFICATE OF CORRECTION

PATENT NO. : 7,477,425 B2 Page 1 of 1
APPLICATION NO. : 10/199833
DATED : January 13, 2009
INVENTOR(S) : William Robert Haas et al.

It is certified that error appears in the above-identified patent and that said Letters Patent is hereby corrected as shown below:

In column 8, line 31, in Claim 29, delete "Location" and insert -- location --, therefor.

In column 10, line 16, in Claim 52, delete "comprising::" and insert -- comprising: --, therefor.

Signed and Sealed this

Fourteenth Day of July, 2009

JOHN DOLL
*Acting Director of the United States Patent and Trademark Office*